Dec. 26, 1961 F. P. ANDERSON ET AL 3,014,377
OVER CENTER BOOSTER FOR A PUSH ROD
Filed Sept. 19, 1960
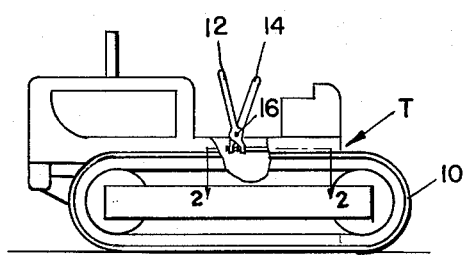
FIG-1
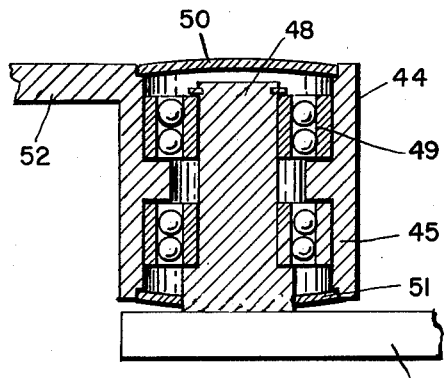
FIG-5
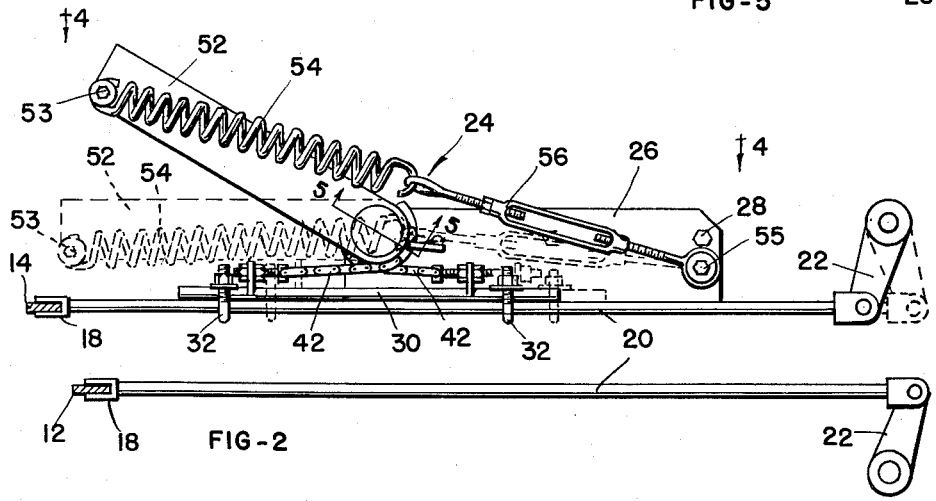
FIG-2
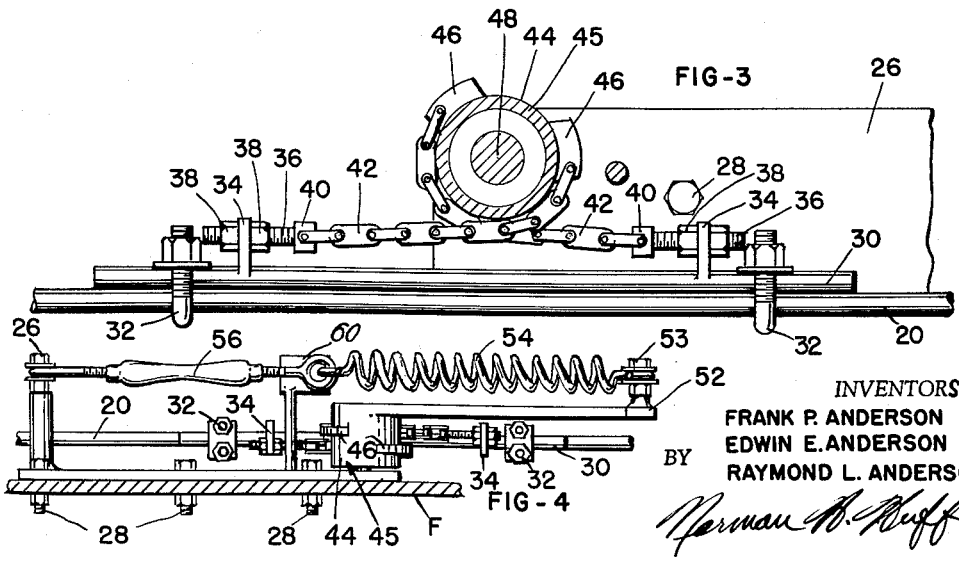
FIG-3
FIG-4
INVENTORS
FRANK P. ANDERSON
EDWIN E. ANDERSON
RAYMOND L. ANDERSON
BY
*Norman B. Huff*

United States Patent Office 3,014,377
Patented Dec. 26, 1961

3,014,377
OVER CENTER BOOSTER FOR A PUSH ROD
Frank P. Anderson, Edwin E. Anderson, and Raymond
L. Anderson, Spokane, Wash.
Filed Sept. 19, 1960, Ser. No. 56,949
3 Claims. (Cl. 74—97)

Our present invention relates to a booster for a push rod of a clutch and more particularly to a clutch actuated by a manually operated lever and is an improvement over our co-pending application Serial No. 748,316, filed July 14, 1958, now Patent No. 2,957,358, for Over Center Lever Assist Mechanism.

The objects of the present invention are similar to those of the said co-pending application and seek to reduce operator fatigue: by nullifying or overcoming to a desired degree clutch spring forces when the lever is pulled and the clutch is disengaged; by augmenting the clutch spring forces when the clutch is engaged; and also precludes wear of parts from vibration by maintaining constant pressure on the linkage.

A further object of the present invention lies in the provision of an improved lever assist mechanism which has a very simple and unique and therefore inexpensive means interconnecting the spring biased over center arm to a push rod which precludes the necessity for the linkage required heretofore.

Yet another object of the present invention lies in the provision of a simplified but effective adjusting means whereby the relative position of the clutch actuating push rod and the spring biased over center arm may be quickly, easily and conveniently adjusted in accordance with manual selection.

In the accompanying drawings wherein a preferred embodiment of the invention is disclosed, and in which like numerals are employed to designate like parts, FIGURE 1 is a side elevation of an endless track type tractor having a portion broken away to show the two clutch control levers and associated push rods;

FIGURE 2 is a plan view of the push rods associated with the clutch operating levers and showing one lever assist mechanism applied thereto;

FIGURE 3 is a horizontal sectional view on an enlarged scale showing the improved means connecting the spring biased over center arm and a push rod;

FIGURE 4 is a vertical view partially in cross section and showing the present invention associated with a push rod and looking in the direction indicated by the arrows 4—4 of FIGURE 2; and FIGURE 5 is an enlarged fragmentary vertical section taken on the plane indicated by line 5—5 of FIGURE 2.

In FIGURE 1 the reference letter T indicates in its entirety a track type tractor which is conventionally operated and steered by de-clutching one or the other of the tracks 10. Each track 10 is controlled by means of a control lever as 12 or 14. At 16 the control levers 12 and 14 are fulcrumed and their lower ends are journaled or pinned in bifurcations 18 at the forward end of push rods 20—20. At the rearward ends, the push rods 20 are pivotally connected to the clutch operating levers 22 and are thus adapted to de-clutch their respective tracks as the levers 12 and 14 are manually actuated.

In FIGURE 1 of the drawing, the lever 12 is shown to be in the normal position in which its respective clutch (not shown) is engaged, so that the engine of the tractor is driving the track 10 while the lever 14 is in the actuated position wherein its respective clutch (not shown) is disengaged and no driving power is applied to the right hand track 10. Because of the fulcrum 16, it is obvious that when the lever 14 is pulled rearwardly, its respective push rod 20 is moved forwardly of the tractor as shown in the full lines of FIGURE 2. When the lever 14 is released it is returned to the normal position with the push rod and associated booster or lever assist mechanism 24 shifted to the broken line position.

The booster or lever assist mechanism 24 is provided with an anchor plate 26 which is secured as by bolts 28 to the floor F of the tractor T.

A clamping bar 30 is rigidly secured as by U-bolts 32 to the push rod 20 with which the booster or lever assist mechanism 24 is associated. Ears 34, adjacent to the opposed ends of the clamping bar 30 and extending normal to the axis thereof, are provided with apertures through which adjusting bolts 36 extend and which are adjustably secured according to manual selection by means of clamping nuts 38 one on each side of each ear 34.

At their inwardly disposed ends, the bolts 36 are provided with heads 40 to which are secured flexible non-extensile members 42—42 here shown as chains but obviously they may take the form of cables or other means capable of bending and yet not stretching. At their inner end portions, the chains 42 wrap around a cylindrical surface 44 of a sleeve 45 in opposite directions for a portion of its circumference, as clearly seen in FIGURE 3, at which points lugs 46 are provided to which the chain ends are secured. It will thus be seen that the chains extend tangentially with respect to the cylindrical surface 44 outwardly to the ears 34 and inwardly from this point extend around the surface substantially 90° in each direction or a total of substantially 180° of the circumference to the points of fixation 46.

The plate 26 supports a vertical spindle 48 which carries bearings 49 upon which bearings the sleeve 45 is journaled in concentricity with the spindle.

The sleeve 45 has its upper and lower ends closed with dust-proof caps 50 and 51. At its upper end, extending radially from the sleeve 45, we provide an arm 52 which, at its outer end, is provided with an anchor post 53 to which the outer end of tension-spring 54 is secured. The inner end of the tension spring 54 is secured to a second fixed anchor post 55 which is secured to the base plate 26 at a location opposed to the anchor post 53 by means of a tightener 56, thus permitting manual adjustment of the tension of spring 54 as found necessary.

It will be noted that at one radial position of the arm 52 the anchor post 53 will be diametrically opposed to the anchor post 55 over the spindle 48. At this point, the booster or lever assist mechanism 24 is on center and the spring 54 is applying no tension or pressure to the push rod 20 through the members 42. However, as the sleeve 45 rotates and the arm 52 moves clockwise, as seen in FIGURE 2, the spring 54 moves over and away from center and tends to further rotate the sleeve 45 thus winding one member 42 about the cylindrical surface 44 while unwinding the other member 42. The spring thus assists in moving the push rod 20 to the left, overcoming to a desired degree the tension of the conventional clutch springs (not shown). When the lever 14 is released or pushed forwardly, the push rod 20 endeavors to move rearwardly or to the right in FIGURE 2 whereupon the members 42 are wound and unwound oppositely upon the cylindrical surface 44 causing the arm 52 to be moved counterclockwise toward the broken line position of FIGURE 2 over the center of spindle 48. Upon passing over center the tension of spring 54 urges the arm 52 counterclockwise, thus maintaining a yieldable tension upon the push rod 20 toward the right side of FIGURE 2.

Normally there is a lost motion movement between the lever 14 and the clutch actuation before the clutch springs begin to compress. Therefore, manual manipulation of the levers 12 and 14 rearwardly will cause forward movement of the push rods 20, the initial movement of which effects clockwise rotation of the arm 52 to cause the spring 54 to pass over center and at the time spring 54 passes over or beyond center, the tension of spring 54 is such as to continue the movement of the push rod to disengage the clutch.

Obviously, the tension of spring 54 may be adjusted to individual requirements. Though normally the tension of spring 54 is slightly less than the tension of the clutch springs so that a certain amount of manual pressure is required to shift the levers 12 and 14, it is possible by increasing the tension of 54 to provide for the spring 54 to overcome the entire resistance of the clutch springs and maintain the clutch in disengagement until manual effort is applied to push the levers forwardly.

A stop 60 precludes over travel of the spring 54 to minimize the effort required to move it over center.

It will thus be seen that the lever assist mechanism is very versatile and by reason of the clamp bar being adjustable lengthwise of the push rod 20 and the flexible members 42 being adjustable provide for infinite adaptability according to individual desires.

Having thus described our invention we desire to secure by Letters Patent of the United States of America the following:

1. In a control device having a manually actuable fulcrumed lever movable alternately between a normal position and an actuated position and adapted to disengage a biased normally engaged clutch when in said actuated position; and over center lever assist mechanism comprising: a spindle fixed relative to the fulcrum of said lever; a sleeve journaled on said spindle and having an arm extending radially therefrom; a spring fixed at one end at a point spaced from said spindle and at the other end connected to the free end of said arm for urging said arm away from a centered position coincident to an imaginary straight line common to the axis of the spindle and the first named end of the spring; flexible non-extensile members secured at their outer ends for rectilinear movements coincident to the said movements of said lever and extending from said ends inwardly toward each other about a portion of said sleeve in opposite directions, and having their ends secured to said sleeve.

2. In a lever assist mechanism for a manually actuable control lever adapted to reciprocate a push rod and said mechanism including an over center spring biased arm; means journaled for swinging movements coupling said arm with said rod comprising; a substantially cylindrical surface concentric with said journal and movable thereabout coincident to swinging movements of said arm; flexible, non-extensile members secured at their outer ends at spaced points on said rod and at opposed sides of said journal, and extending inwardly toward each other, about said cylindrical surface in opposed directions, and being secured relative to said surface at at least one point circumferentially remote from the tangents of said flexible members and said surface.

3. The invention defined in claim 2 and further characterized by said flexible members being chains and having adjusting means for varying the lengths of said chains.

References Cited in the file of this patent
UNITED STATES PATENTS

| | | |
|---|---|---|
| 1,540,247 | Bowman | June 2, 1925 |
| 2,593,072 | Talbot | Apr. 15, 1952 |